(12) United States Patent
Osborne

(10) Patent No.: US 9,646,093 B2
(45) Date of Patent: May 9, 2017

(54) COLOR CODED SYMBOL BASED WORLD WIDE WEB INDEXING AND RETRIEVAL SYSTEM

(71) Applicant: Morgan Kennedy Osborne, La Jolla, CA (US)

(72) Inventor: Morgan Kennedy Osborne, La Jolla, CA (US)

( * ) Notice: Subject to any disclaimer, the term of this patent is extended or adjusted under 35 U.S.C. 154(b) by 113 days.

(21) Appl. No.: 14/639,973

(22) Filed: Mar. 5, 2015

(65) Prior Publication Data

US 2015/0269204 A1    Sep. 24, 2015

Related U.S. Application Data

(60) Provisional application No. 61/969,244, filed on Mar. 23, 2014.

(51) Int. Cl.
*G06F 17/30* (2006.01)

(52) U.S. Cl.
CPC .............................. *G06F 17/30864* (2013.01)

(58) Field of Classification Search
CPC ................................................ G06F 17/30864
USPC ........................................................ 707/711
See application file for complete search history.

(56) References Cited

U.S. PATENT DOCUMENTS

| | | | | |
|---|---|---|---|---|
| 5,133,052 A * | 7/1992 | Bier | ........................ | G06T 11/00 345/619 |
| 6,039,574 A * | 3/2000 | Standiford | ............. | G09B 19/12 273/237 |
| 6,144,378 A * | 11/2000 | Lee | ........................ | G06F 3/0236 715/767 |
| 7,890,549 B2 * | 2/2011 | Elad | ........................ | G06Q 10/10 706/11 |
| 2002/0174118 A1 * | 11/2002 | Bates | ................. | G06F 17/30696 |
| 2008/0313173 A1 * | 12/2008 | Popper | .............. | G06F 17/30899 |
| 2014/0025661 A1 * | 1/2014 | Hu | ..................... | G06F 17/30864 707/722 |
| 2014/0156703 A1 * | 6/2014 | Teong | ............... | G06F 17/30637 707/772 |

\* cited by examiner

*Primary Examiner* — Sheree Brown

(57) ABSTRACT

Machines, systems, and methods for a color coded symbol based world wide web indexing and retrieval system is provided. A method for using color coded symbol permutations for indexing and retrieving information on the world wide web, comprising using color coded symbol permutations, relating one or more than one piece of information thereto, and storing said color coded symbol permutations and their related one or more than one piece information for future lookup.

14 Claims, 8 Drawing Sheets

COLOR CODED SYMBOL BASED WORLD WIDE WEB INDEXING AND RETRIEVAL SYSTEM

CROSS-REFERENCE TO RELATED APPLICATIONS

This application claims the benefit of Provisional Application No. 61/969,244, Titled "COLOR CODED SYMBOL BASED SEARCH ENGINE AND WORLD WIDE WEB INDEXING SYSTEM", Filed on Mar. 23, 2014.

FEDERALLY SPONSORED RESEARCH

None.

SEQUENCE LISTING

None.

COPYRIGHT & TRADEMARK NOTICES

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

TECHNICAL FIELD

The disclosed subject matter relates to world wide web indexing and retrieval and, more particularly, to machines, systems, and methods thereof by way of creating color coded symbol permutations and storing said color coded symbol permutations in a databank (in color coded symbol form and/or color coded symbol in assigned alphanumeric code form) and relating one or more than one piece of information to each color coded symbol permutation and allowing information lookup requests for color coded symbol permutations (in color coded symbol form and/or color coded symbol in assigned alphanumeric code form) and/or their respectively related one or more than one piece of information, whereby said related one or more than one piece of information is any of the following: a website's color coded symbol permutation name, a website's domain name, a website's internet protocol address, a website's internet address, a website's folder path, a website's description, a website's page title, a website's meta tags, a website's location, a website's contact information, a website's content, a color coded symbol's image, a color coded symbol permutation's image, a color coded symbol permutation's images, a data file, a piece of information, and/or any other data and/or files on the internet.

BACKGROUND

This invention relates to the world wide web, search engines, and the world wide web indexing domain name system. The world wide web (a.k.a., the internet) has been indexed mainly using letters, numbers, and a combination of the two. Much of the time letters used from a certain language all comprised in a specific arrangement end-up forming a known word, collection of words, or acronym thereto, and are used for domain names and internet addresses. Under this type of indexing system the internet domain name registry has grown in its indexing size and ability.

Unfortunately, the length and complexity of the domain names and internet addresses have also grown. This becomes problematic for people who want an easy way to communicate (or display) what might end up being a very lengthy and complex domain name or internet address. Additionally, the time needed to write down, type out, recite, copy, paste, and/or save all these various domain names and internet addresses are tedious, prone to error, and is wasteful. Furthermore, as the length of domain names and internet addresses increases their utility decreases. By charting this relationship between domain name/internet address complexity and utility on a line graph we see the following (FIG. 8): Over time, as the complexity of domain names/internet addresses increases the utility of domain names/internet addresses decreases.

This type of internet indexing and corresponding search engine indexing is archaic and does not advance the species in its desire for improved efficiencies, improved utilities, and accommodations. This presents a major problem.

In conclusion, insofar as I am aware, there is no such invention as a COLOR CODED SYMBOL BASED WORLD WIDE WEB INDEXING AND RETRIEVAL SYSTEM. I propose in the following, a way to index the world wide web using a color coded symbol based system that captures the mathematical ability of large numbers through permutations and relating one or more than one piece of information to each permutation; while also offering information lookup requests to these permutations (in color coded symbol form and/or color coded symbol in assigned alphanumeric code form) and/or their related one or more than one piece of information through a mobile or stationary computing system's internet browser or software, a search engine, a website, a device's software, a device's visual recognition software, a device's voice recognition software, or any other type of computer, electronic device, and/or software.

SUMMARY

In summarizing, certain advantages, aspects, and novel features have been described with this disclosure. Not all of these advantages may be fully achieved in any one particular embodiment described herein. Accordingly, it is understood that the disclosed subject matter may be embodied or conducted in a manner that achieves one of these advantages, or a group of these advantages, without achieving all of these advantages, as may be taught, suggested, or disclosed herein.

In accordance with one embodiment, machines, systems, and methods for a color coded symbol based world wide web indexing and retrieval system. The method comprises selecting one or more than one color, one or more than one symbol, and one or more than one place set; creating one or more than one color coded symbol by combining each one or more than one color with each one or more than one symbol; assigning or not assigning an alphanumeric code to each color coded symbol; selecting from the one or more than one color coded symbol to create one or more than one permutation thereof pursuit to the one or more than one place set previously selected to be allowed within each permutation; allowing or not allowing repetition of color coded symbols within each permutation during the permutation creating process; combining or not combining the resulting set of one or more than one permutation with one or more than one other resulting set of one or more than one permutation created using the same methods; storing in a databank some of or all of said set of one or more than one permutation or some of or all of said combined set of permutations, in color coded symbol form and/or color coded symbol in assigned alphanumeric code form; relating one or more than one piece of information to each stored permutation and/or assigned alphanumeric code; and allowing information lookup requests for said stored one or more than one permutation, one or more than one assigned alphanumeric code, and/or their related one or more than one piece of related information, whereby the one or more than one piece of related information is any of the following: a website's color coded symbol permutation name, a website's domain name, a website's internet protocol address, a website's internet address, a website's folder path, a website's description, a website's page title, a website's meta tags, a website's location, a website's contact information, a website's content, a color coded symbol's image, a color coded symbol permutation's image, a color coded symbol permutation's images, a data file, a piece of information, and/or any other data and/or files on the internet.

In connection with one or more than one embodiment, an exemplary flow diagram and/or exemplary compressed step diagram is provided herein. The exemplary flow diagram and/or exemplary compressed step diagram is configured to perform the functions and/or operations related with the above disclosed methods. In another embodiment, a computing system program comprising a data indexing and retrieval program is disclosed.

One or more than one of the above disclosed embodiments (in addition to a number of alternatives) are provided in further detail below, including thereof references to the figures attached. It is to be understood that the disclosed subject matter is not to be limited to any particular embodiment disclosed.

BRIEF DESCRIPTION OF THE DRAWINGS

The disclosed embodiments may be better understood by referring to the figures in the attached drawings, as provided below. (Note: No other color, besides that of black, is displayed in the attached black-and-white drawings, because of this, and since color is part of a color coded symbol the specific color is noted above, below, or to the left of the color coded symbol and may sometimes also be in parenthesis.)

FIG. 6 illustrates an exemplary search engine where color coded symbol permutations may be entered, click-linked, placed, accessed, utilized, and/or searched for.

FIG. 7 illustrates an exemplary browser (and webpage) where color coded symbol permutations may be entered, click-linked, placed, accessed, utilized, and/or searched for.

Certain elements, features, and aspects that are referenced by the same numeral notation in more than one figure, represents the same, equivalent, or similar elements, features, or aspects, in according with one or more than one embodiment.

DETAILED DESCRIPTION OF EXAMPLE EMBODIMENTS

In the following detailed description of example embodiments, a number of specific details are disclosed to provide a thorough description of various embodiments. Some embodiments may be practiced without these specific details or with some alteration and/or variations in detail. Additionally, in some instances, some aspects or features are described with less detail so as to not make other aspects or features unclear. The amount of detail associated with each of the elements, aspects, or features should not be construed to qualify the novelty or importance of one element, aspect, or feature over the others.

Figure 1:
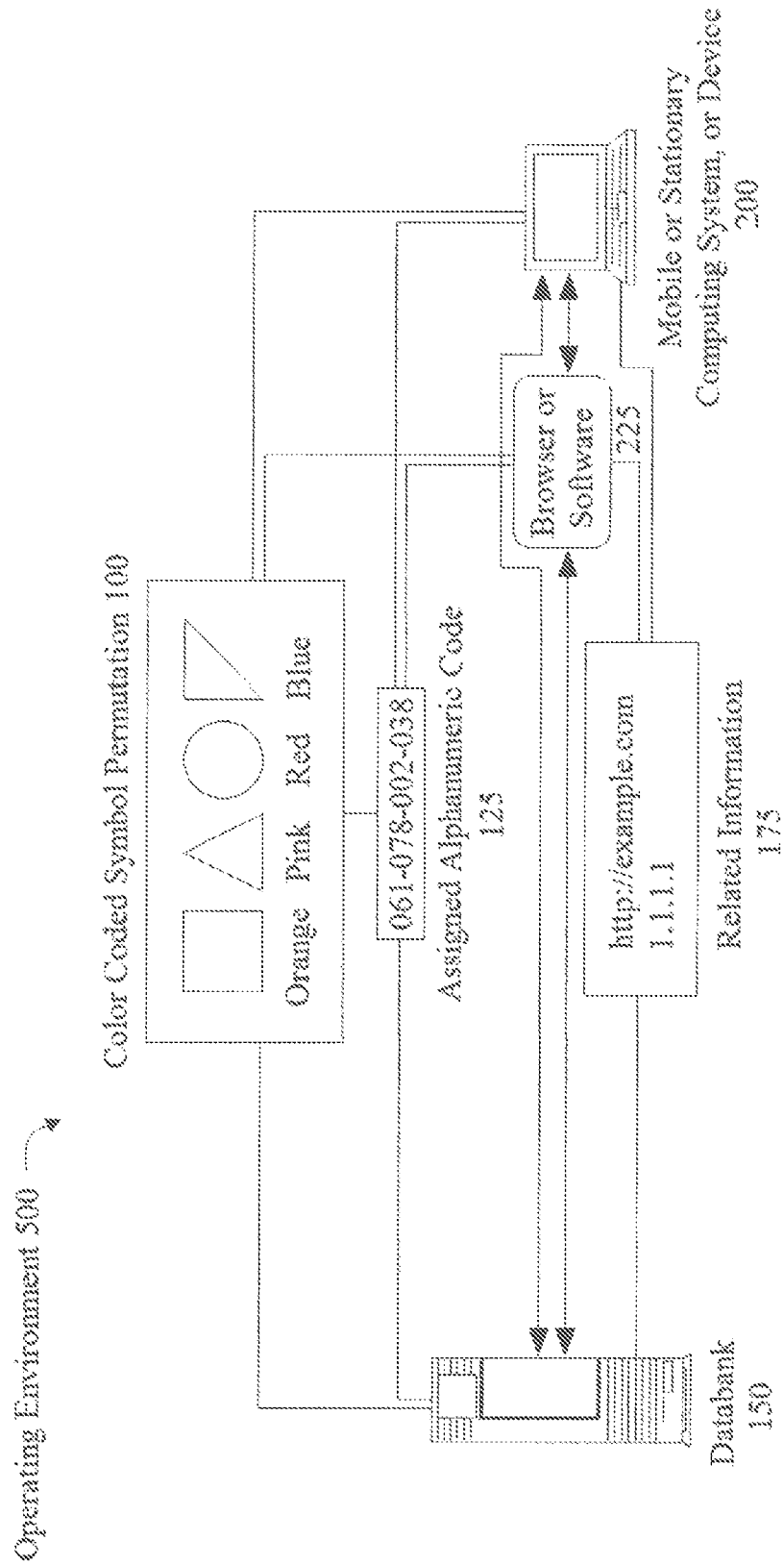
FIG. 1 illustrates an exemplary operating environment in accordance with one or more embodiments, wherein a mobile or stationary computing system, or device, using a browser or software, sends an information lookup request for a color coded symbol permutation to a databank and receives one or more than one piece of information related to that color coded symbol permutation.

Referring to FIG. 1, an example operating environment 500 is illustrated in which a mobile or stationary computing system, or device, 200 may be used with an internet browser or software 225 by a user to send information lookup requests for a color coded symbol permutation 100 to a databank 150 by way of including in the information lookup request the color coded symbol permutation 100 in its color coded symbol form and/or its assigned alphanumeric code 125 form. Upon receiving the information lookup request, the databank 150 performs a search for a match of the color coded symbol permutation 100 in color coded symbol based form and/or its assigned alphanumeric code 125 form. If a match is found, databank 150 will reply with all the related information 175 to the color coded symbol permutation 100, or if the information lookup requested only specific related information 175 of the color coded symbol permutation 100 then the databank 150 will reply with only the specific related information 175 requested, or if the information lookup requested only specific related information 175 along with (or as part of) a forwarding request then the databank 150 will direct the internet browser or software 225 of the mobile or stationary computing system, or device, 200 to the location identified in the specific related information 175.

For purposes throughout herein, and for specific definitional purposes, the term "databank" 150 may include any of the following: sql databases, no-sql databases, flat files, text files, files stored in memory, files stored on server side, files stored on client side, replicative databases, rotating databases, distributed databases, combination of distributed databases, cloud databases, compact disk data storages, relational databases, non-relational databases, flash memory stored data, and/or any other type of data storage and retrieval system.

Figure 2:
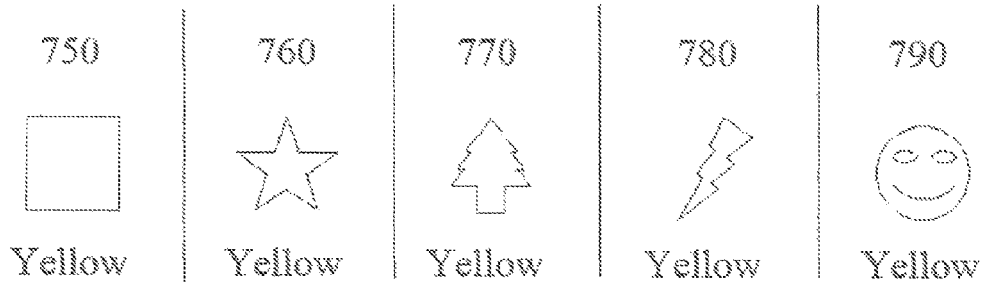
FIG. 2 illustrates an exemplary number of color coded symbols.

Again for purposes throughout herein, and for specific definitional purposes, the term "color" may include any possible color, and "symbol" may include any possible symbol, and when each color is combined with each symbol to form color coded symbols, then by selecting from these color coded symbols to create color coded symbol permutations 100. Importantly, where a color coded symbol may have a main color, for example the color of yellow, in addition to this there may be an accent color, for example a gray or black outline and/or internal feature lining, however for purposes herein this example would still be referred to as a yellow color coded symbol (e.g., [referring to FIG. 2] "yellow square" symbol 750, "yellow star" symbol 760, "yellow tree" symbol 770, "yellow lightning bolt" symbol 780, and "yellow smiley face" symbol 790).

Figure 3:
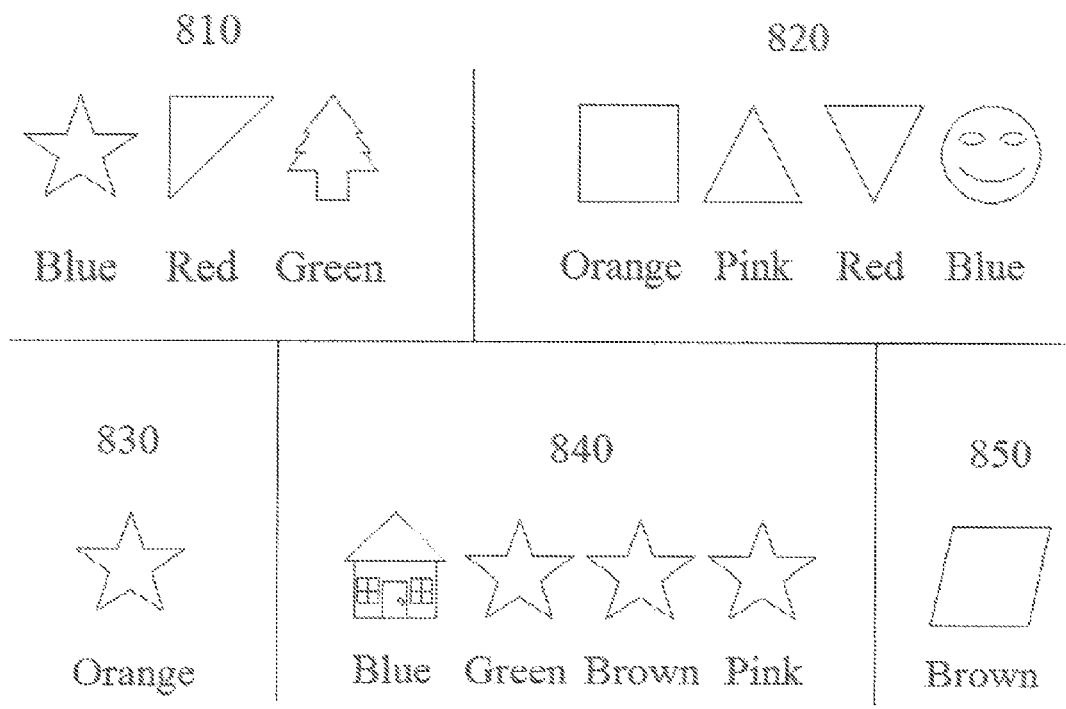
FIG. 3 illustrates an exemplary number of color coded symbol permutations.

As part of understanding the various embodiments described herein, understanding the distinction between symbols and pictures is essential. Where a picture communicates information largely based upon its sometimes hundreds, thousands, or millions of colors, symbols take a very different approach. Symbols communicate information largely based upon the shape involved and limited colors, with the emphasis on the shape, and where the limited colors usually do not exceed more than approximately 3 or 4, and these limited colors are presented usually with one main color and usually no more than approximately 2 to 3 accent colors. Accordingly then, where color coded symbols are the building blocks of color coded symbol permutations 100 we can see multiple non-exclusive examples of these color coded symbol permutations 100 [referring to FIG. 3] in 810, 820, 830, 840, and 850.

By looking at the three place set color coded symbol permutation 810 we see "blue star, red upper-left triangle, green tree", whereas in the four place set color coded symbol permutation 820 we see "orange square, pink triangle up, red triangle down, blue smiley face". Continuing with the one place set color coded symbol permutation 830 we see "orange star". Further again, with the four place set color coded symbol permutation 840 we see "blue house, green star, brown star, pink star", and finally in the one place set color coded symbol permutation 850 we see "brown parallelogram right".

Figure 4:
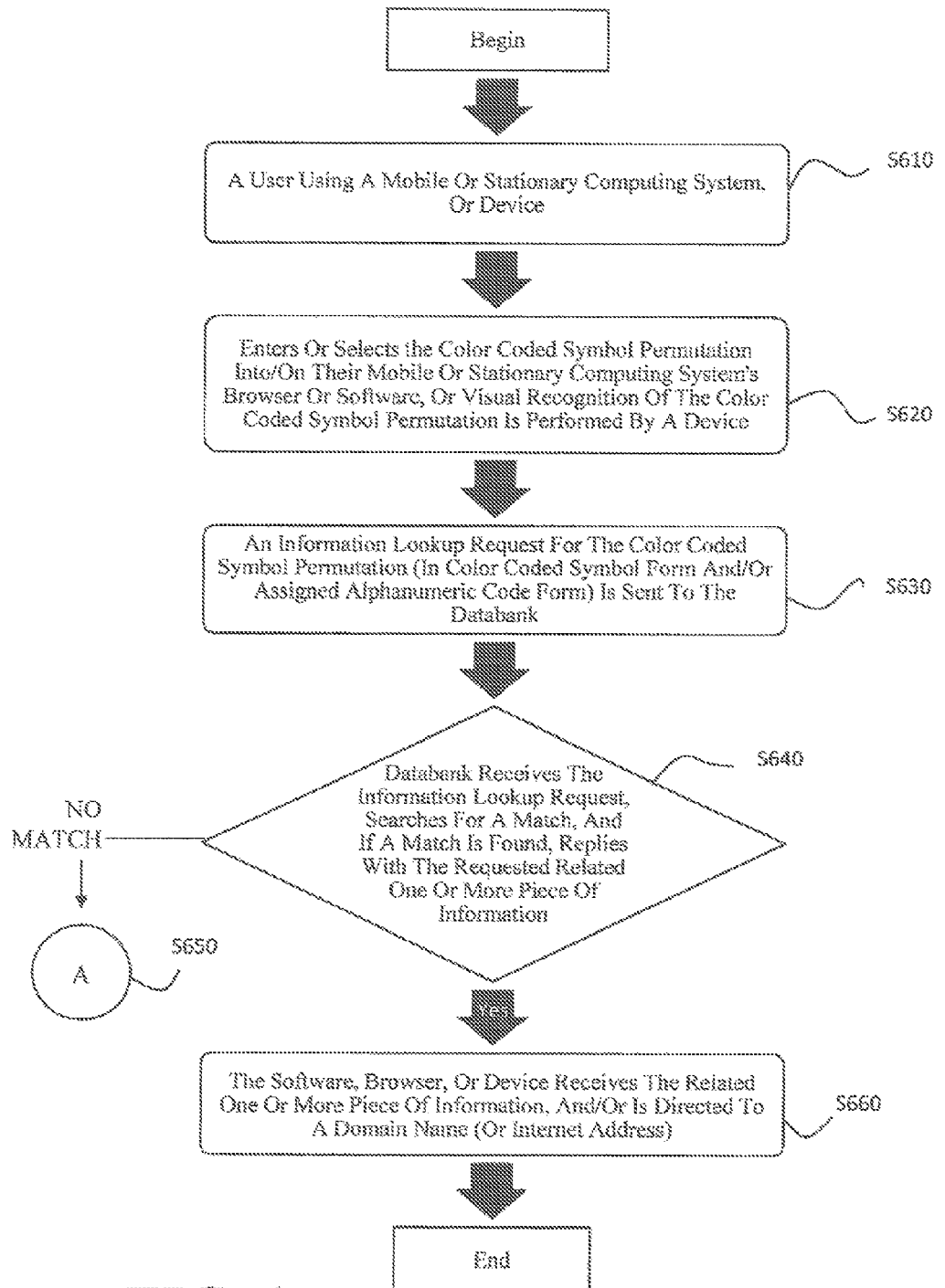
FIG. 4 is an exemplary flow diagram of a method of sending an information lookup request for a color coded symbol permutation to the databank.

Referring to FIG. 1 and FIG. 4, in another non-exclusive embodiment, a user using a mobile or stationary computing system, or device, 200 (S610) may have viewed a color coded symbol permutation 100 on television, online, a billboard, a vehicle, a telephone display screen, a radio player display screen, or other device's screen, and said user enters or selects the color coded symbol permutation 100 into/on their mobile or stationary computing system, or device's, 200 browser or software 225 (S620), or said user uses their mobile or stationary computing system, or device, 200 to perform a visual recognition of the color coded symbol permutation 100 (S620), followed by an information lookup request for the color coded symbol permutation 100 (in color coded symbol 100 form and/or assigned alphanumeric code 125 form) being sent to the databank 150 (S630). Upon the databank 150 receiving the information lookup request for the color coded symbol permutation 100, the databank 150 does a search of its stored data to find a match with the color coded symbol permutation 100. If a match is found, the databank 150 replies with either all the related information 175 for the coded symbol permutation 100, or if only specific related information 175 was requested, then the databank 150 replies with only the specific related information 175 (S640). However, if the databank 150 does not find a match, then the databank may reply with an error message, item not found message, or auto-forward the user to a predefined landing webpage (S650). Continuing where the databank 150 did find a match, and replied to the user with the desired related information 175, it then is that the browser or software 225, and/or mobile or stationary computing system, or device, 200 receives the related information 175 (specific or general, as the case may be), and/or is then directed to a domain name or internet address identified in the related information 175 (again, specific or general, as the case may be) (S660).

In another non-exclusive embodiment (and implementation thereof), a user may see a color coded symbol permutation 100 online, perhaps next to an item for sale, at say an online retailer's website, or with say a brick-and-mortar retailer who also has an online store, and the user wants to learn more information about that item. The user then may click the color coded symbol permutation 100 (in online image link form) which executes an information lookup request with the databank 150 for the color coded symbol permutation 100 (in color coded symbol form and/or color coded symbol in assigned alphanumeric code 125 form) and then redirects the user's browser to a location identified (e.g., domain name, internet address) in one of the specific pieces of related information 175; or the user may then write down the color coded symbol permutation 100 by quickly drawing the symbols that make up the color coded symbol permutation 100 and then notating the colors associated with each symbol (all taking a few seconds), and then search for the color coded symbol permutation 100 using a search engine 900 at a future date; or in the case of a brick-and-mortar retailer where the user first viewed the item online and had drawn and notated the color coded symbol permutation 100 associated with this item of interest, whereby later on visiting a store associated with the retailing of this same item may either hand to one of the retailer's employees the drawn and notated color coded symbol permutation 100 allowing the retailer's employee to perform the search or if the store is equipped with a mobile or stationary computing system, or device, 200 allowing the user to perform the search for the color coded symbol permutation 100 and then share the item of interest with the retailer's employee.

Figure 6:
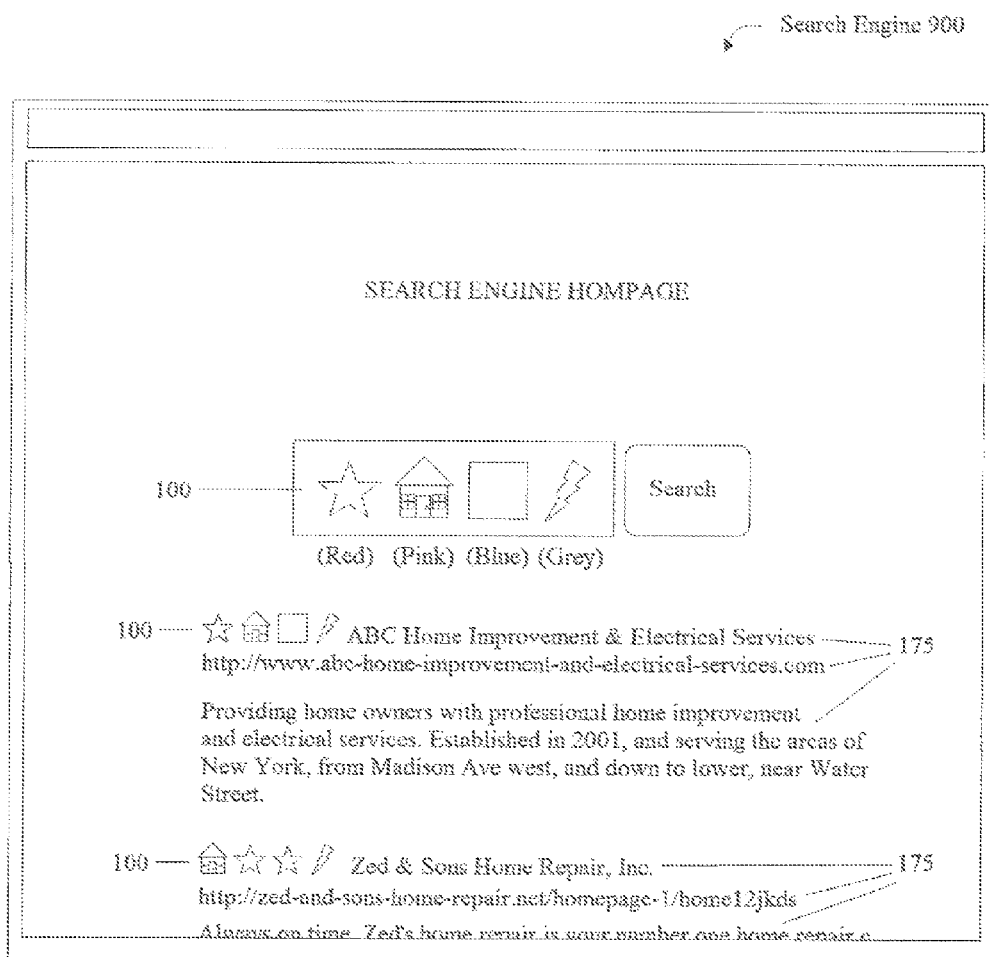

In another non-exclusive embodiment, a user using a mobile or stationary computing system, or device, 200 performs an information lookup request for a color coded symbol permutation 100 through a [FIG. 6] search engine 900. Whereby upon the databank 150 finding a match, the search engine 900 displays the related information 175.

In an additional non-exclusive embodiment, a user using a mobile or stationary computing system, or device, 200 performs an information lookup request for a color coded symbol permutation 100 through a [FIG. 6] search engine 900. Whereby upon the databank 150 finding a match, the search engine 900 displays the related information 175 to the match and additional related information 175 to other color coded symbol permutations 100.

In one more non-exclusive embodiment, a user using a mobile or stationary computing system, or device, 200 performs an information lookup request for a color coded symbol permutation 100 through a [FIG. 6] search engine 900. Whereby upon the databank 150 not finding a match, the search engine 900 displays the related information 175 to other color coded symbol permutation 100.

Figure 7:
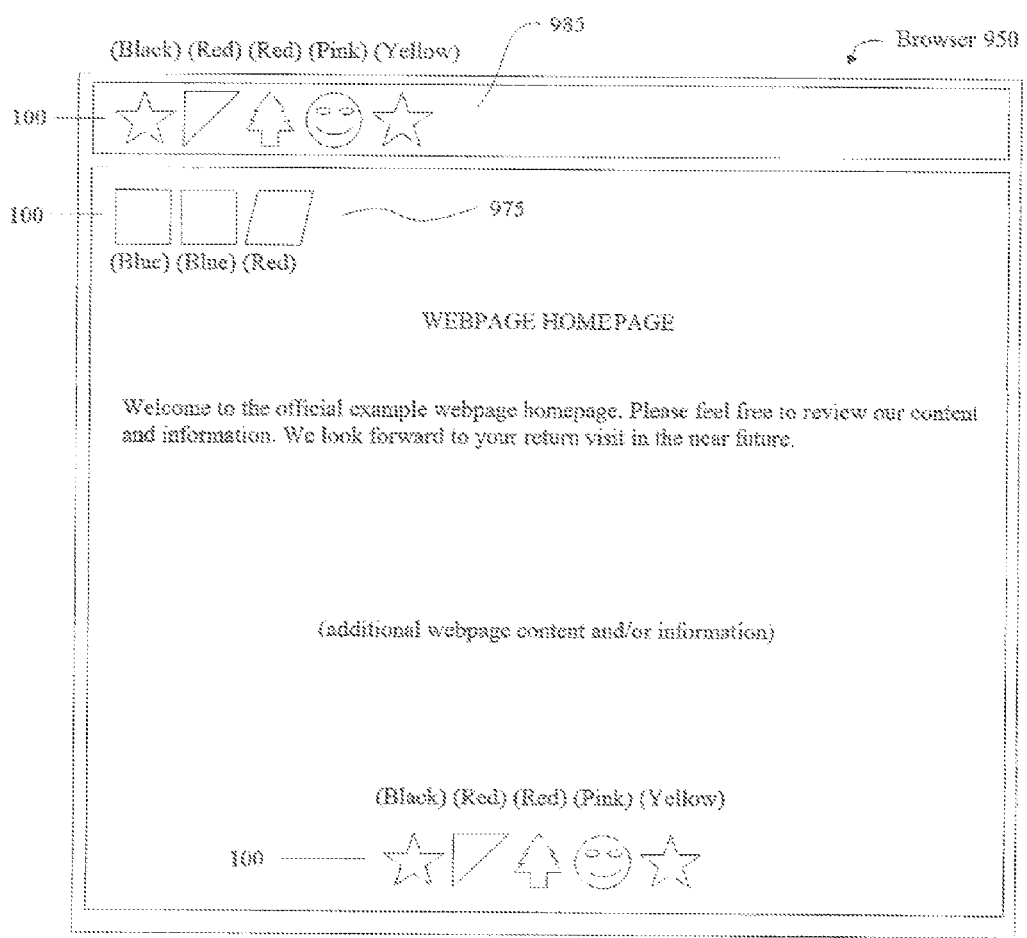
Figure 8:
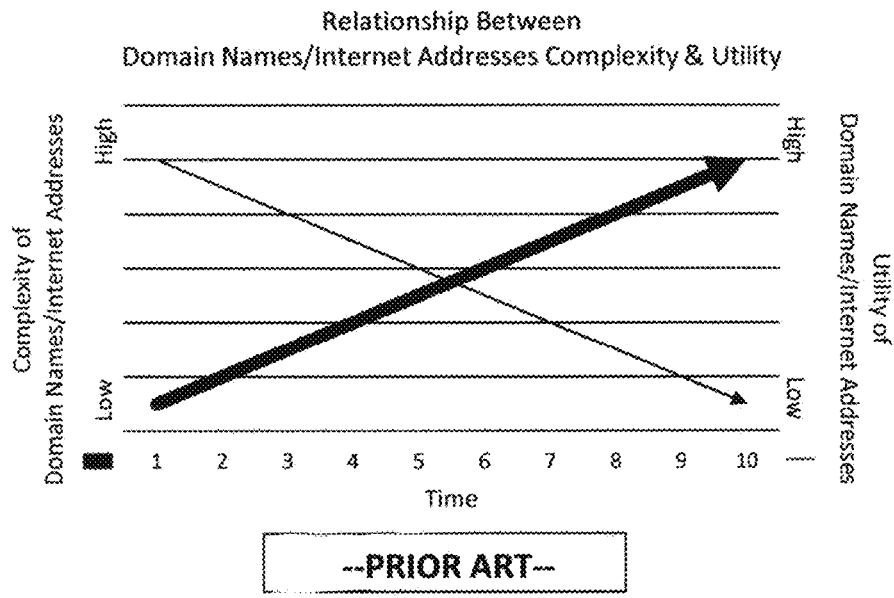
FIG. 8 illustrates by way of an exemplary line graph the relationship between domain name/internet address complexity and utility.

In an additional non-exclusive embodiment, a user using their browser or software 225 online may enter into or select through a menu a color coded symbol permutation 100 into [FIG. 7] a browser's 950 address bar 985 which then executes an information lookup request with the databank 150. Where upon the databank 150 finding a match the databank 150 then instructs, directs, or redirects the browser 950 to a location identified (e.g., domain name, internet address) in the related information 175 of the color coded symbol permutation 100.

In an additional non-exclusive embodiment, a user using their browser or software 225 online may enter into or select through a menu a color coded symbol permutation 100 into [FIG. 7] a browser's 950 address bar 985 which then executes an information lookup request with the databank 150. Where upon the databank 150 not finding a match the databank 150 then instructs, directs, or redirects the browser 950 to a predefined landing webpage.

In again one more non-exclusive embodiment, a website [FIG. 7] owner may place on their website 975 a color coded symbol permutation 100 as a link enabled image which when clicked by a visitor to the website executes an information lookup request with the databank 150. Where upon the databank 150 finding a match the databank 150 then instructs, directs, and/or redirects the browser 950 to a location identified (i.e., domain name, internet address) in the related information of the color coded symbol permutation 100.

In further one more non-exclusive embodiment, a website [FIG. 7] owner may place on their website 975 a color coded symbol permutation 100 as a link enabled image which when clicked by a visitor to the website executes an information lookup request with the databank 150. Where upon the databank 150 not finding a match the databank 150 then instructs, directs, and/or redirects the browser 950 to a predefined landing webpage.

Figure 5:
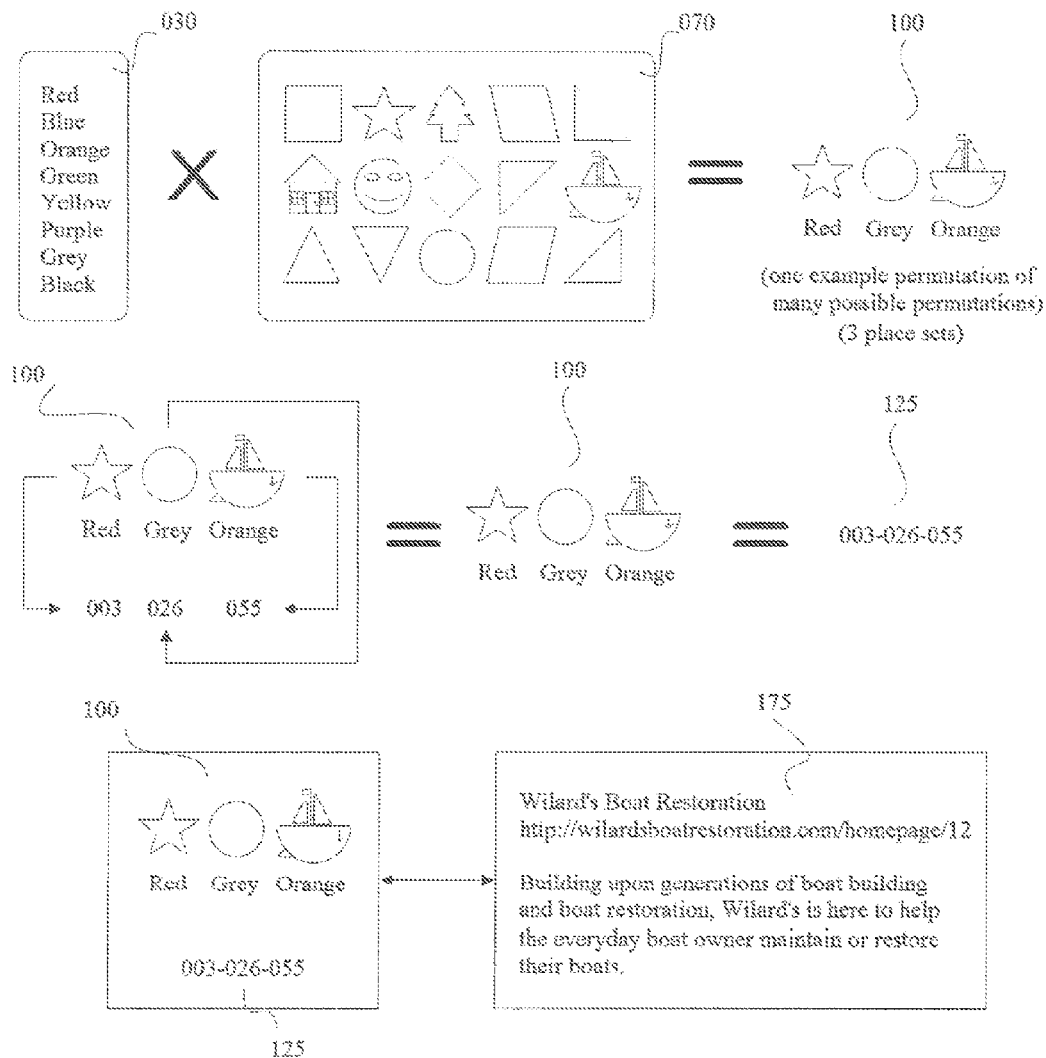
FIG. 5 is an exemplary compressed step diagram (read left-to-right) of a method of creating a single permutation and relating one or more than one piece of information.

In further one more non-exclusive embodiment of the method disclosed, where one color coded symbol permutation 100 is being created [FIG. 5] we see that multiple colors 030 and multiple symbols 070 are combined so that each color is fused with each symbol, then through the creation of permutations to form color coded symbol permutations 100, and where for example purposes herein through the permutation process we get one color coded symbol permutation 100 which is "red star, grey circle, orange boat" 100. Continuing on by taking the newly created color coded symbol permutation 100 and identifying its assigned alphanumeric code 125, followed by relating one or more than one piece of information (related information 175) to the color coded symbol permutations 100 and assigned alphanumeric code 125. (Note: For the sake of brevity, and since FIG. 5 gives an example of creating a single color coded symbol permutation 100 (from many possible resulting color coded symbol permutations 100) and relating one or more than one piece of information (related information 175), FIG. 5 does not show the steps of assigning each separate color coded symbol its specific assigned alphanumeric code 125 for later on creating the assigned alphanumeric code 125 when dealing with a color coded symbol permutation 100; choosing the number of place set(s); deciding to allow or not allow repetition within each permutation; and deciding to combine or not combine the entire set of permutations with one or more than one other set of permutations.)

Figure 10:
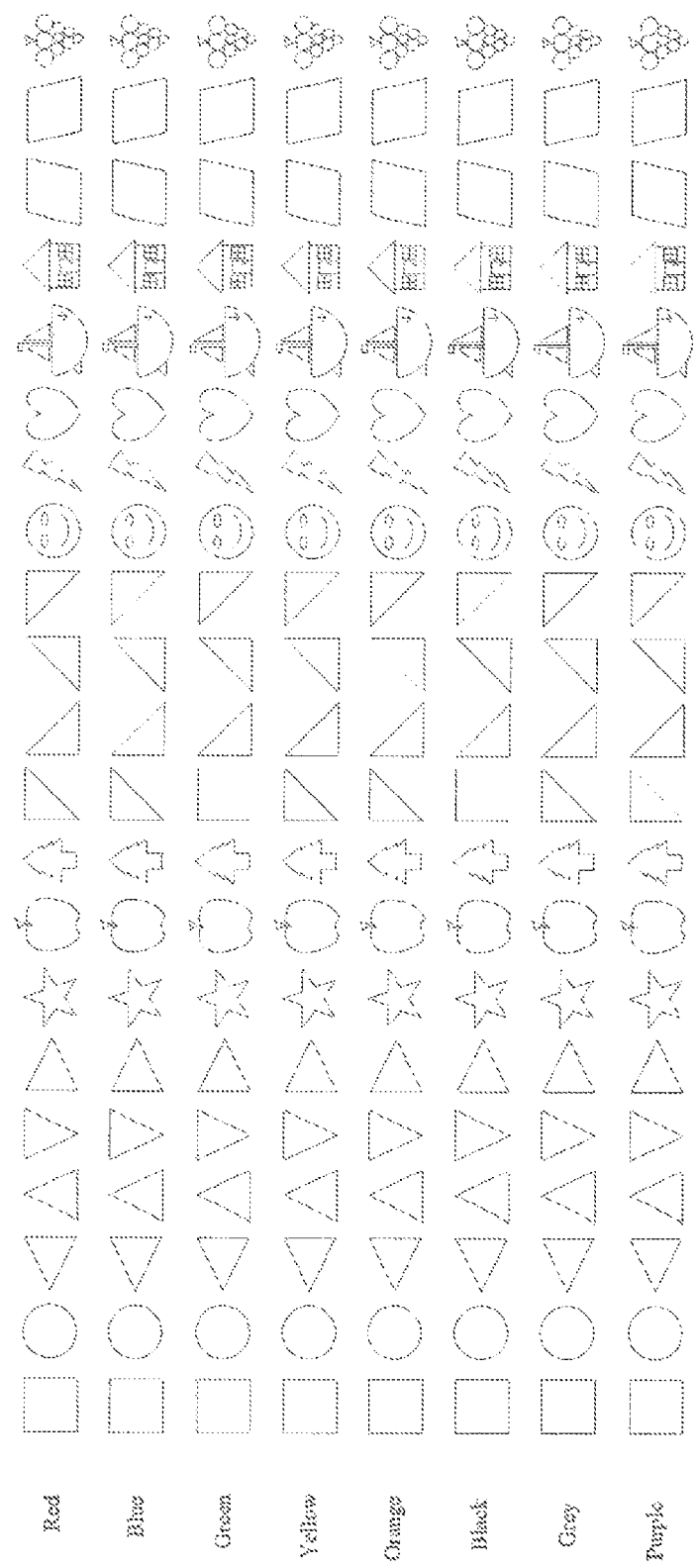
FIG. 10 illustrates some exemplary color coded symbols, along with giving an example of a combining of some colors and symbols, and may also be considered an exemplary menu from which color coded symbols may be selected from as discussed in some non-exclusive embodiments herein.

Referring to FIG. 10, we see some exemplary color coded symbols with their respective colors noted to the left. In identifying the symbols we see "square". "circle", "triangle left", "triangle up", "triangle down", "triangle right". "star", "apple", "tree", "upper-left triangle", "lower-left triangle", "lower-right triangle", "upper-right triangle", "smiley face", "lightning bolt", "heart", "boat", "house", "parallelogram right", "parallelogram left", and "grape". In identifying the colors we see "red", "blue", "green", "yellow", "orange", "black", "grey", and "purple". Thus, if we randomly select one color coded symbol from FIG. 10, we may get "red square", or "grey apple", or "orange grape", or "purple parallelogram right", or "blue upper-left triangle", etc. Additionally, from FIG. 10 we can see these eight colors, and twenty-one symbols, are combined so that each color is merged with each symbol, which creates one-hundred sixty-eight color coded symbols.

In one more non-exclusive embodiment a computing system program creating and executing data indexing and retrieval thereof, where color coded symbol permutations 100 (in color coded symbol form and/or color coded symbol in assigned alphanumeric code 125 form) are created and then related to one or more than one piece of information (related information 175) and recalled at a later date normally by way of an information lookup request. Where said computing system program is flexible to its order of methods, its order of creation and storage to its color coded symbol permutations 100, assigned alphanumeric codes 125, related informations 175, and other fields or programmatic structures involved. Living on, or being, (or in other embodiments only in communication with) the databank 150 the computing system program facilitates various aspects discussed herein.

In yet another non-exclusive embodiment a machine being used by (or being) the databank 150, where the components of the machine are distributed throughout the internet residing on various servers and/or hosting platforms. Where information lookup requests are routed through an orchestrated (or sometimes archaic) series of re-routings, transfers, and/or replies attempting to find the requested information and responding with the related information 175 thereto. Similar (but different) to the hierarchical system of root servers that comprise today's known world wide web, said embodied machine may live on top of, in cohabitation with, or surrounding in sphere, with this existing world wide web architecture, but instead use this existing architecture as its underground plumbing (or single plane in its sphere) to perform user information lookup requests for color coded symbol permutations 100 (in color coded symbol form and/or color coded symbol in assigned alphanumeric code 125 form).

In yet one more non-exclusive embodiment, where color coded symbol permutations 100 (in color coded symbol form and/or color coded symbol in assigned alphanumeric code 125 form) perform their indexing for a domain name or internet address, additional color coded symbol permutations 100 (in color coded symbol form and/or color coded symbol in assigned alphanumeric code 125 form) may be added to perform sub-indexing thereof. Where the main indexing is say "blue square, blue square, blue square" 100, followed by a sub-indexing of a page thereto is "red triangle" 100, and then another sub-indexed page to "blue square, blue square, blue square" 100 may be "orange star" 100; allowing for users to stake a claim to a main indexed coded symbol permutation 100 and add through sub-indexing color coded symbol permutations 100 to other pages (e.g. trunk-to-branch-to-leaves).

Figure 9:
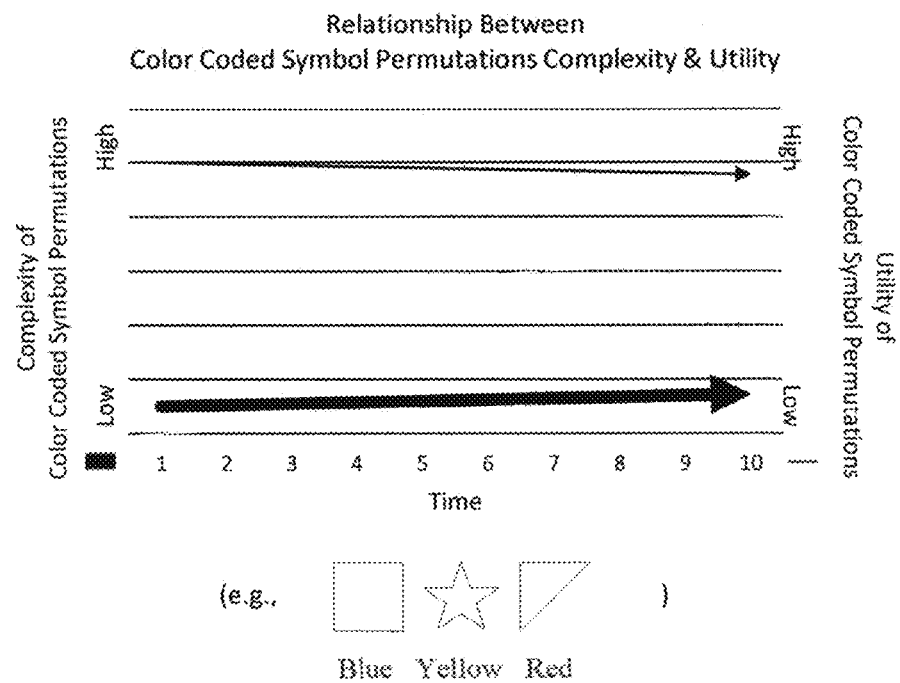
FIG. 9 illustrates by way of an exemplary line graph the relationship between color coded symbol permutation complexity and utility.

Importantly, and as previously discussed with "colors" and "symbols", it is understood herein that "place sets" may take on one or more than one place set. Additionally, the ability to add new symbols and/or colors to increase the end quantity of color coded symbol permutations 100 without having to add place sets is understood. While conversely to this, the number of symbols and/or colors may remain un-increased but the one or more than one place set may be increased to also increase the number of permutations. Thus, there is flexibility in the system; and ultimately overall complexity growth is minimized without great sacrifice to utility (FIG. 9).

In making this disclosure, it is understood and for definitional purposes, that the terms "world wide web" and "internet" as used throughout are used interchangeably, and are to cover the broadest interpretations possible of each term. While some skilled in the art may argue that there are differences between the two, the teachings herein purposely makes no distinctions between these two terms and consider them as one. By way of making this paragraph it to be understood that the subject matter disclosed herein is to capture the networks of networks that connects the world through hardware (computers, servers, satellites, cables and more) and software, and also that of the numerous types of protocols involved (e.g., TCP/IP, OSI, IP, IPv4, IPv6, RTPS, SSH, FTP, SMTP, TCP, Telnet, HTTP, HTTPs, SFTP, SSL, TLS, POP, E6, NTP, PPP, NNTP, IMAP, etc.), and also uniform resource locators (URL), domain name servers (DNS), domain name system (DNS), root servers, registry name servers, domain names, and internet addresses, etc.

Additionally, while the disclosure herein has been shown and described with reference to a number of non-exclusive embodiments, it will be understood by those skilled in the art that various changes in form and detail may be made without departing from the spirit and/or scope of the claimed subject matter. Any variations, modifications, and/or additions to the non-exclusive embodiments described are possible and may fall within the scope of the disclosure as detailed within the following claims and their legal equivalents.

What is claimed is:

1. A method for indexing and retrieving the world wide web, the method comprising:
   a) selecting one or more than one color, one or more than one symbol, and one or more than one place set, and storing the selections in memory hardware;
   b) creating one or more than one color coded symbol by combining each one or more than one color with each one or more than one symbol, and storing each created one or more than one color coded symbol in memory hardware;
   c) assigning or not assigning an alphanumeric code to each color coded symbol, and storing any assigned alphanumeric code in memory hardware;
   d) selecting from the one or more than one color coded symbol to create one or more than one permutation thereof pursuant to the one or more than one place set previously selected to be allowed within each permutation, and storing each created one or more than one permutation in memory hardware;
   e) allowing or not allowing repetition of color coded symbols within each permutation during the permutation creating process, and storing each created one or more than one permutation in memory hardware;
   f) grouping or not grouping one or more than one permutation with one or more than one other permutation, and storing any grouping in memory hardware;
   g) storing in a databank in memory hardware one or more than one permutation in color coded symbol form and/or color coded symbol assigned alphanumeric code form;
   h) relating one or more than one piece of information to each stored permutation in color coded symbol form and/or color coded symbol assigned alphanumeric code form, and storing each related one or more than one piece of information to each stored permutation in color coded symbol form and/or color coded symbol assigned alphanumeric code form in the databank in memory hardware;
   i) allowing information lookup requests for the stored one or more than one permutation in color coded symbol form, one or more than one permutation in color coded symbol assigned alphanumeric code form, and/or one or more than one piece of related information stored in the databank in memory hardware; and
   j) presenting a menu which displays one or more than one color coded symbol, wherein selections from said menu identify a permutation in color coded symbol form and/or color coded symbol assigned alphanumeric code form for information lookup within the databank in memory hardware, and wherein a information lookup request for a permutation in color coded symbol form and/or color coded symbol assigned alphanumeric code form results in one or more than one piece of related information to be transmitted from the databank in memory hardware to a sender of the information lookup request.

2. The method of claim 1, wherein the one or more than one piece of related information is any of the following: a website's color coded symbol permutation name, and website's domain name, a website's internet protocol address, a website's internet address, a website's folder path, a website's description a website's page title, a website's meta tags, a website's location, a website's contact information, website's content, a color coded symbol's image, a color coded symbol permutation's image, a color coded symbol permutation's images, a data fie, a piece of information, and/or any other data and/or tiles on the internet.

3. The method of claim 1, wherein the information lookup requests are sent by any of the following: a mobile or stationary computing system's internet browser or software, a search engine, a website, a device's software, a device's visual recognition software, a device's voice recognition software, or any other type of computer, electronic device, and/or software.

4. The method of claim 1, wherein a new piece of related information is generated at a time of an information lookup request.

5. The method of claim 1, wherein a new piece of related information is generated after a time of an information lookup request.

6. The method of claim 1, wherein the information lookup requests are sent by a human.

7. The method of claim 1, wherein the information lookup requests are sent by artificial intelligence.

8. A color coded symbol based world wide web indexing and retrieval system, comprising:
   a) one or more than one color coded symbol in creating one or more than one permutation thereof and stored in memory hardware;
   b) wherein allowing or not allowing repetition of color coded symbols within each permutation during the creation of each permutation stored in memory hardware;
   c) wherein if repetition of color coded symbols is not allowed, a total possible number of one or more than one permutation in memory hardware is a factorial of, a product of one or more than one color and one or more than one symbol, all divided by, a factorial of, a product of one or more than one color and one or more than one symbol less one or more than one place set, $$\text{total possible permutations} = \frac{n!}{(n-r)!}$$

where, n=c×s
 c=one or more than one color
 s=one or more than one symbol
 r=one or more than one place set
and, n≥r;

d) wherein if repetition of color coded symbols is allowed, a total possible number of one or more than one permutation in memory hardware is a product of one or more than one color and one or more than one symbol, raised to a power of one or more than once set,
total possible permutations=$n^r$
where, n=c×s
 c=one or more than one color
 s=one or more than one symbol
 r=one or more than one place set
and, n≥r;

e) wherein each permutation is assigned or not assigned an alphanumeric code, and any assigned alphanumeric code is stored in memory hardware;

f) wherein one or more than one permutation is grouped or not grouped with one or more than one other permutation, and any grouping is stored in memory hardware;

g) a databank in memory hardware that stores one or more than one permutation in color coded symbol form and/or color coded symbol assigned alphanumeric code form, and relates one or more than one piece of information to each stored permutation in color coded symbol form and/or color coded symbol assigned alphanumeric code form, and allows information lookup requests for the stored one or more than one permutation in color coded symbol form, one or more than one permutation in assigned alphanumeric code form, and/or one or more than one piece of related information; and h) a menu which displays one or more than one color coded symbol, wherein selections from said menu identify a permutation in color coded symbol form and/or color coded symbol assigned alphanumeric code form for information lookup within the databank in memory hardware, and wherein a information lookup request for a permutation in color coded symbol form and/or color coded symbol assigned alphanumeric code form results in one or more than one piece of related information to be transmitted from the databank in memory hardware to a sender of the information lookup request.

9. The system of claim 8, wherein the one or more than one piece of related information is any of the following: a website's color coded symbol permutation name, a website's domain name, a website's internet protocol address, a website's internet address, a website's folder path, a website's description, a website's page title, a website's meta tags, a website's location, a website's contact information, a website's content, a color coded symbol's image, a color coded symbol permutation's image, a color coded symbol permutation's images, a data file, a piece of information, and/or any other data and/or files on the internet.

10. The system of claim 8, wherein the information lookup requests are sent by any of the following: a mobile or stationary computing system's internet browser or software, a search engine, a website, a device's software, a device's visual recognition software, a device's voice recognition software, or any other type of computer, electronic device, and/or software.

11. The system of claim 8, wherein a new piece of related information is generated at a time of an information lookup request.

12. The system of claim 8, wherein a new piece of related information is generated after a time of an information lookup request.

13. The system of claim 8, wherein the information lookup request are sent by a human.

14. The system of claim 8, wherein the information lookup requests are sent by an artificial intelligence.

\* \* \* \* \*